United States Patent [19]

Burks et al.

[11] Patent Number: 4,791,400

[45] Date of Patent: Dec. 13, 1988

[54] REMOTE CONTROL FOR ENGINE OIL LEVEL INDICATOR

[76] Inventors: Leroy Burks, 5401 Ilex Ave.; Clarence E. Burks, 10202 Watterson Trail, both of Louisville, Ky. 40213

[21] Appl. No.: 17,821

[22] Filed: Feb. 24, 1987

[51] Int. Cl.⁴ .............................................. B60Q 1/00
[52] U.S. Cl. ...................................... 340/59; 340/60; 340/612; 116/227
[58] Field of Search .............. 340/59, 60, 52 R, 624, 340/626, 612; 200/83 R, 84 R; 73/308, 307; 116/109, 227, 228, 229

[56] References Cited

U.S. PATENT DOCUMENTS

| | | | |
|---|---|---|---|
| 2,588,761 | 3/1952 | Raby | 340/59 |
| 3,636,510 | 1/1972 | Winfield | 340/59 |
| 4,572,097 | 2/1986 | Chapelsky | 340/59 |

Primary Examiner—Donnie L. Crosland
Attorney, Agent, or Firm—Scott R. Cox

[57] ABSTRACT

A remote control for engine oil level indicator assembly for incorporation with the dipstick assembly of a vehicle engine for determining when the oil level reaches a point when oil should be added. This remote oil level indicator includes an air valve assembly that has a tube connecting it to the dipstick assembly, as well as a second tube furnished with a manually-operated plunger associated with the vehicle dashboard within reach of the driver, as well as an electrical switch having an air-actuated switch connector for closing the switch. Associated with this switch is an electrical lamp on the dashboard that is connected to a source of electrical energy (car battery) such that when the ignition switch is closed the lamp will be energized. The manual plunger is used by the driver to increase the air pressure within the air valve assembly to cause the movable switch connector to function by rising up to energize the lamp circuit and inform him or her of the level of the oil in the reservoir and that travel conditions are satisfactory to proceed.

3 Claims, 3 Drawing Sheets

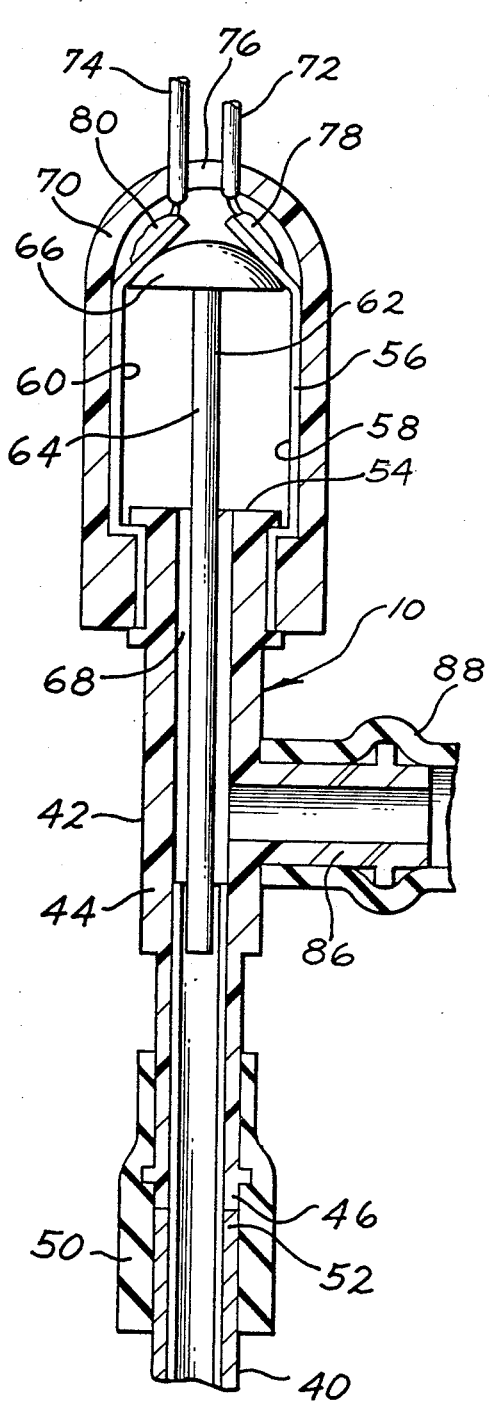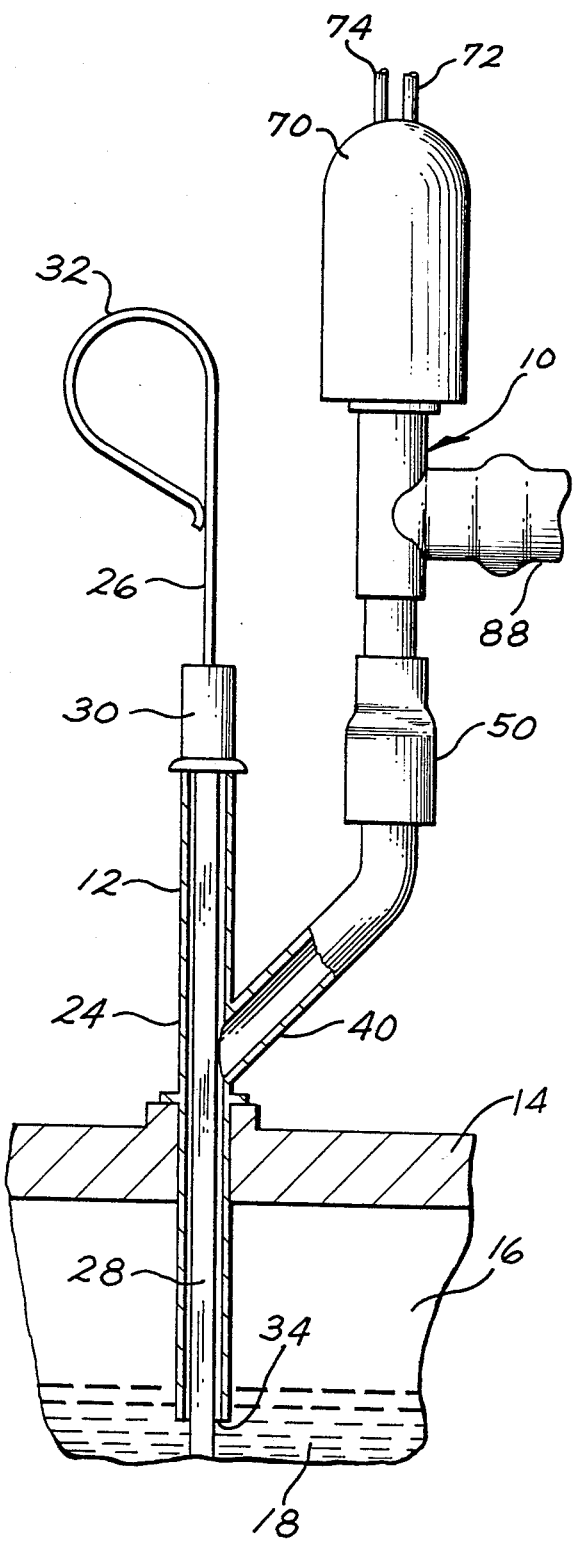

REMOTE CONTROL FOR ENGINE OIL LEVEL INDICATOR

BACKGROUND OF THE INVENTION

1. Field of the Invention

This invention relates to the art or remote control for engine oil level indicators for vehicle engines and, particularly, motor vehicles, where the user is able to obtain a quick reading of the oil level while remaining seated within the vehicle.

2. Description of the Prior Art

It is an age-old pratice to open the hood of the vehicle and remove the dipstick from the side of the engine and wipe it off so that when it is reinserted into the engine it can be withdrawn again and the level of the oil within the reservoir can be determined. The main objection to this system is that the dipstick is located in a greasy out-of-the-way location so that it is difficult to see the dipstick tube opening for replacing the dipstick, as well as difficult to perform this operation without your shirt sleeve or jacket become soiled with oil and grease.

The Raby U.S. Pat. No. 2,588,761 describes a complex motor vehicle oil level indicator for indicating the level of oil in the engine of a motor vehicle on the dashboard of a vehicle. This is a vacuum-actuated instrument having an ON/OFF button in combination with a red and green light. As the button is pressed, the red light first shows. If the oil level of the engine is satisfactory, the red light goes out and the green light shows. If the oil level is low, the green light does not show and the red light continues on. This is a much more complex and expensive indicator system than the present invention.

OBJECTS OF THE PRESENT INVENTION

The principal object of the present invention is to provide a remote control for an engine oil level indicator assembly for incorporation with the dipstick assembly of a motor vehicle whichis simple in construction and reliable in operation so that it can be incorporated with the present dipstick assembly so as to obtain the convenience of both options of a manual dipstick procedure and/or this remote oil level indicator procedure.

SUMMARY OF THE INVENTION

The present invention provides a remote control for engine oil level indicator assembly combined with the dipstick assembly of an engine where the dipstick assembly has an extended dipstick tube that terminates at exactly the oil level which represents when a quantity of oil should be added to the reservoir. An air valve assembly is provided for a first tube joined to the dipstick tube assembly, and also a second tube furnished with a manually-operated plunger, as well as a third electrical switch having a air-actuated switch connector for closing the switch. Associated with this switch is an electrical device that is joined to a source of electrical energy for indicating the oil level is satisfactory when the device is energized. The manual plunger means is able to increase the air pressure within the air valve assembly to cause a lightweight switch connector to function and rise up to close the electrical switch so as to energize the electrical device that signals when the oil should be replenished or is satisfactory in quantity as it stands.

BRIEF DESCRIPTION OF THE DRAWINGS

This invention will be better understood from the following description taken in conjunction with the accompanying drawings, and its scope will be pointed out in the appended claims.

FIG. 1 is a fragmentary elevational view, partly in cross section, of the dipstick assembly of a vehicle engine, partly in cross section, showing the air valve assembly of the remote control for an engine oil level indicator invention of the present application.

FIG. 2 is a fragmentary assembly view of the air valve assembly of FIG. 1 on an enlarged scale and partly in cross section so as to show the construction and inner workings of this air valve assembly.

DESCRIPTION OF THE PREFERRED EMBODIMENTS

Figure 3:
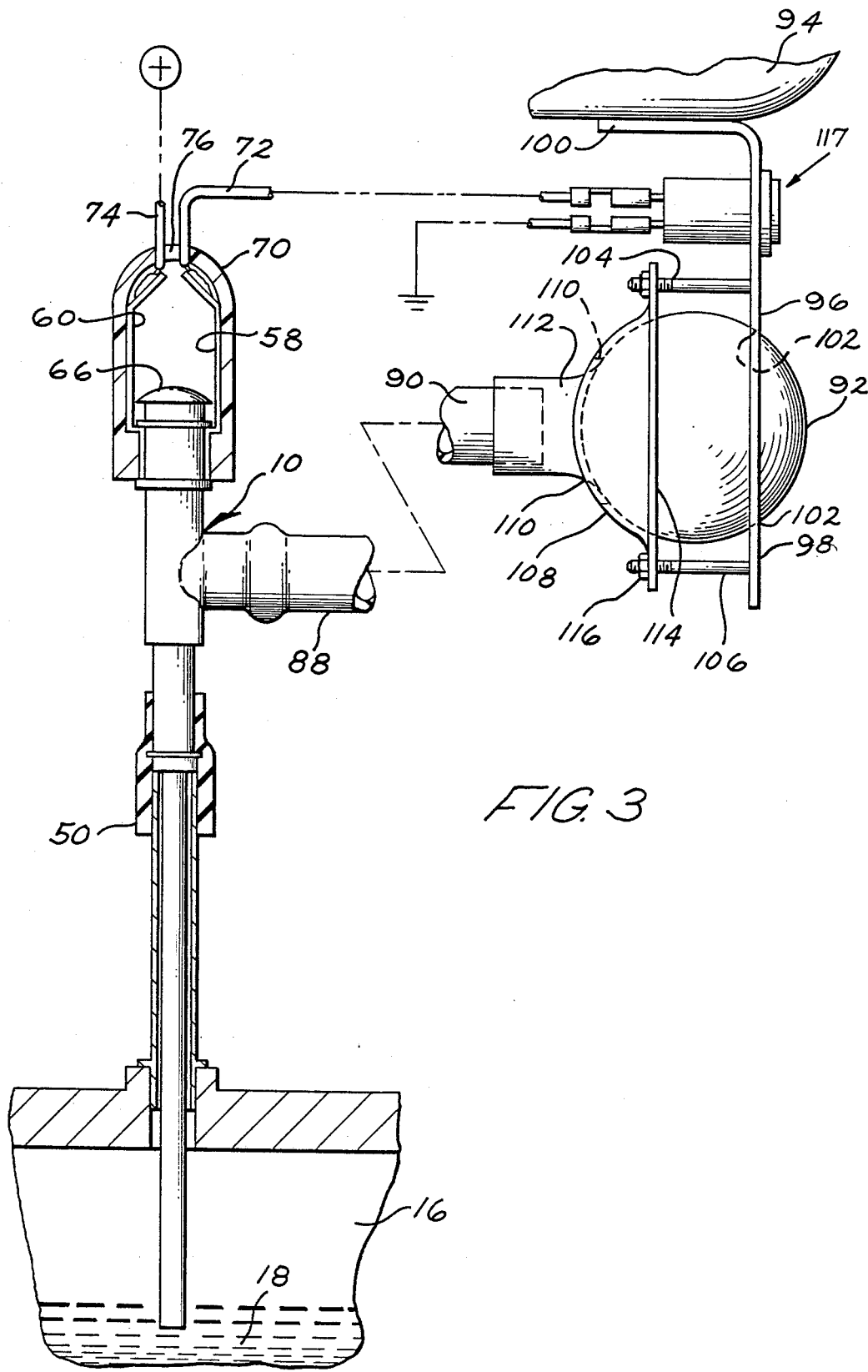
FIG. 3 is a fragmentary elevational view of a second modification of the present invention where the standard dipstick tube has been eliminated from the dipstick assembly, and a manually-actuated plunger is connected by a flexible tube to the air valve assembly and the plunger is located adjacent the underside of the vehicle dashboard and is in combination with an electrical lamp and a source of electrical energy for completing the oil level indicator assembly.

Turning now to a consideration of the drawings and, in particular, to the fragmentary elevational view of FIG. 1, there is shown a remote control for engine oil level indicator assembly 10 of the present invention associated with the dipstick assembly 12 that is mounted in the lower portion of the engine 14 which includes the oil reservoir 16. This reservoir contains the lubricating oil 18 for the moving parts of this engine while it is running.

The dipstick assembly 12 has two main elements; namely, a dipstick-receiving tube 24 and the standard dipstick 26 which includes an elongated blade 28 and a ferrule 30 at its upper end which terminates in an upper handle 32. One important change has been made in the dipstick-receiving tube 24 and that is it has been extended downwardly into the oil reservoir 16 to terminate at point 34 which is at a level which represents the oil level when a quantity of oil such as one quart should be added to the oil reservoir 16 to render it FULL. In other words, the standard dipstick 26 will have markings at the bottom end (not shown) that will read "add oil" and also "full." This lower terminal point 34 of the dipstick-receiving tube 24 is at the point where the blade 28 of the dipstick will be marked "add oil."

Associated with the dipstick-receiving tube 24 at a point outside of the engine 14 is a side take-off tube 40 which rises up and is connected to the oil level indicator assembly 10 of the present invention.

Attention is directed to the fragmentary, cross-sectional, elevational view of FIG. 2 which shows the inner workings of this oil level indicator assembly 10. There is an air valve assembly 42 which has a T-shaped housing 44 where the head of the T is vertically disposed. Now turning attention to FIG. 2, the lower end 46 of the T-head 44 is provided with a resilient connector 50 of plastic, rubber, or the like, for making a mating connection with the upper end of 52 of the side take-off tube 40. The upper end 54 of the T-shaped housing 44 is provided with an electrical switch assembly 56 which comprises a pair of spaced switch contacts 58 and 60 which are supported from the upper end 54 of the T-shaped housing 44, and they cooperate with a lightweight, movable, air-actuated switch connector 62 that has a mushroom head 66. This switch connector is furnished with an elongated vertical stem 64, which extends down through the air valve assembly 42, and a mushroom-like head 66 in a normal, atrest position, or mode, of this oil level indicator assembly. This lightweight, air-actuated switch connector 62 would be fully lowered by gravity down through the air valve assembly 42 when the plunger is released, and the mushroom-like head 66 would rest upon the upper end 54 of this air valve assembly so as to close the air passage 68 of the air valve assembly. In FIG. 2, the air pressure within the air valve assembly 42 has been raised so as to lift the air-actuated switch connector 62 by the increase in the air pressure to its uppermost position where the head 66 of the connector will bridge across the lower ends of the two spaced terminals of the switch contacts 58 and 60 and close the circuit between those switch contacts. A transparent insulating cover 70 is provided for the electrical switch assembly 56 so as to enclose the switch and protect it from damage and contamination. Wire leads 72 and 74 are brought in under the cover or through an opening 76 in the top for attachment to the switch contacts 58 and 60 as at 78 and 80 to a source of electrical energy, the car battery (not shown), as an example.

Figure 4:
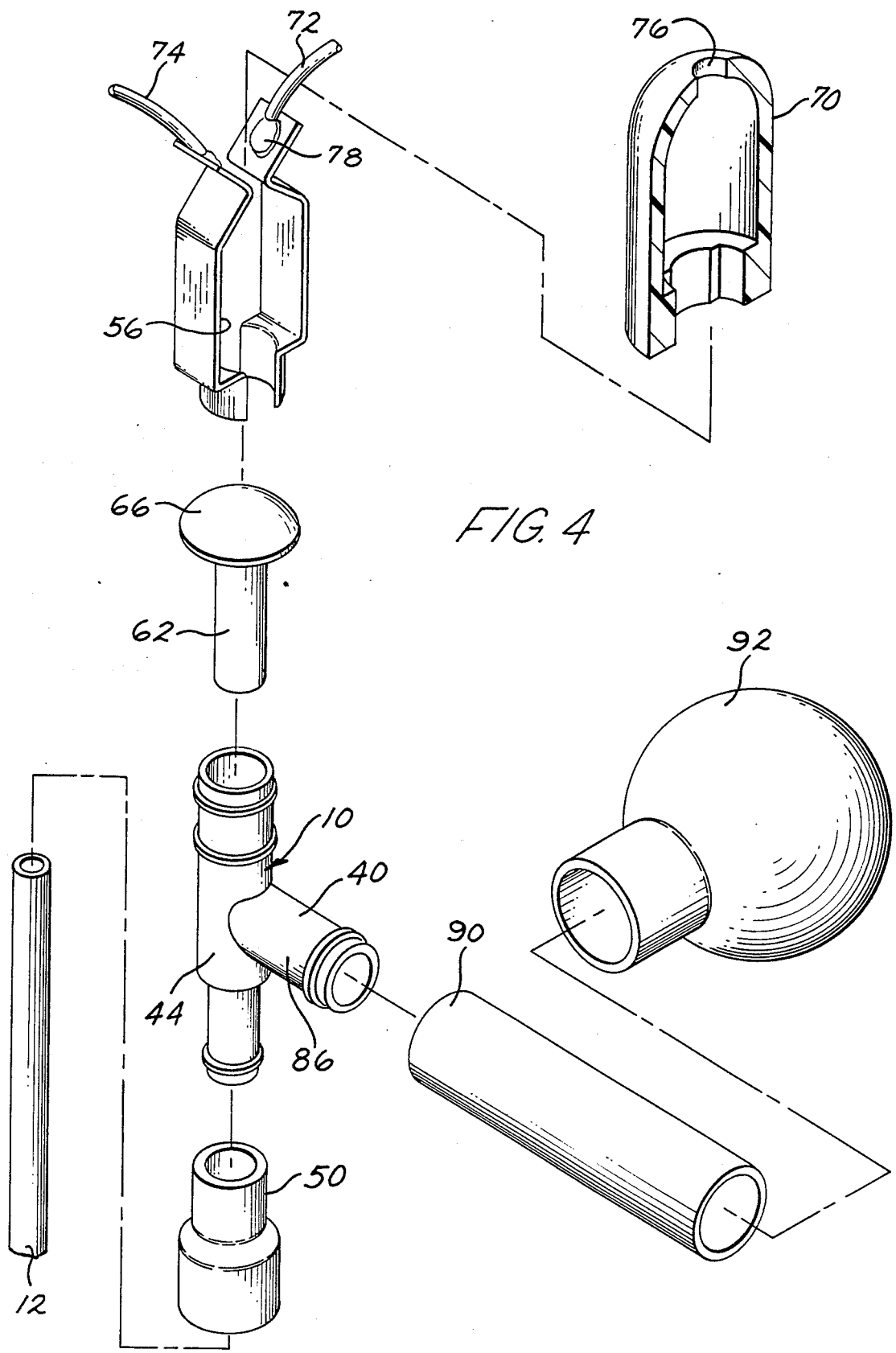
FIG. 4 is an exploded view of the remote oil level indicator assembly of the present invention which is used for both modifications of the invention of FIG. 1 and FIG. 3.

The base 86 of the T-shaped housing 44 is disposed horizontally from the air valve assembly 42, and it is provided with a flexible conector 88 for making a mating connection with a flexible tube 90, as best seen in FIG. 3, which, in turn, is provided on its free end with a manually-operated plunger, or aspirator bulb, 92, which is adapted to be mounted within reach of the driver to the underside of a dashboard 94 of a motor vehicle by means of the mounting plate assembly 96, as shown in the second modification of FIG. 4. This mounting plate assembly 96 has a face plate 98 with an upper flange 100 that is shown attached to the underside of the dashboard 94. The face plate 98 has a circular opening 102 for receiving the spherical plunger 92. The back side of the face plate 98 is furnished with a pair of spaced mounting bolts 104 and 106 for receiving a semi-spherical back-up plate 108, which has a circular opening 110 for receiving the reduced end 112 of the plunger aspirator 92. This back-up plate 108 also has a vertical flange 114 with suitable openings for receiving the mounting bolts 104 and 106 therein, and it is held in place by the nuts 116 that are each assembled to one of the mounting bolts.

In operation when the oil level is to be checked, the aspirator bulb 92 is squeezed. If there is sufficient oil within the engine, this action forces any oil that is in the dip stick receiving tube 24 out of that tube. When the aspirator bulb is released, oil is sucked back up into the dip stick receiving tube. When the aspirator bulb is squeezed, the pressure in the dip stick receiving tube is raised which forces up the air-actuated switch connector 62. This switch connector makes contact with the electrical switch assembly 56 to complete the circuit and cause an electric current to flow through the wire leads 72 and 74. This electric current will flow to a illumination device 117 which will then be lighted up to show that there is sufficient oil in the engine.

Should the oil level be below the point where no oil is sucked up into the receiving tube 24 the switch connector will not make contact and the circuit will not be completed. As a result the illumination device 117 will not be activated. This will indicate that oil should be added to the engine.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A remote control for an engine oil level indicator assembly for an engine for use with the dipstick assembly thereof, said indicator comprising:
   a. a tube within the oil reservoir of the engine which is assembled to the dipstick assembly and terminates at its lower end at an oil level which represents approximately one quart low;
   b. an air valve assembly comprised of a T-shaped housing where the head of the T is vertically disposed, the lower end of the T-head being provided with a rigid first tube means that is joined to the dipstick assembly, the upper end of the T-head being provided with an electrical switch and support for the vertical movement therein of an air-actuated switch connector, the base of the T-shaped housing being disposed horizontally and being provided with a flexible second tube means joined between it and the said manually operated plunger wherein said electrical switch is connected to an electrical circuit containing a source of electrical current;
   c. whereby the oil level indicator assembly is operated when a manually-operated plunger means is caused to increase the air pressure within the said air valve assembly so as to cause the said switch connector to function and close the electrical switch; and
   d. wherein the said manually operated plunger means is adapted to be associated with a vehicle dashboard within reach of a driver of the vehicle and said electrical circuit includes an illumination device that is visible when the driver operates the said plunger.

2. The invention as recited in claim 1 wherein the said dipstick assembly includes an extended dipstick tube that terminates at the oil level which represents when a quantity of oil should be added to the reservoir, the upper portion of this dipstick tube including a side take-off tube that is connected to the said first tube means of the air valve assembly so as to make possible both a standard manual dipstick procedure for oil level indication and a remote control of an oil level indication procedure.

3. The invention as recited in claim 1 wherein the said air valve assembly includes a transparent top cover portion for protecting the electrical switch means and the movable switch connector from damage and contamination.

* * * * *